June 24, 1930. P. M. HODGE 1,766,384
ANIMAL DRAFT EQUALIZER
Filed March 1, 1929
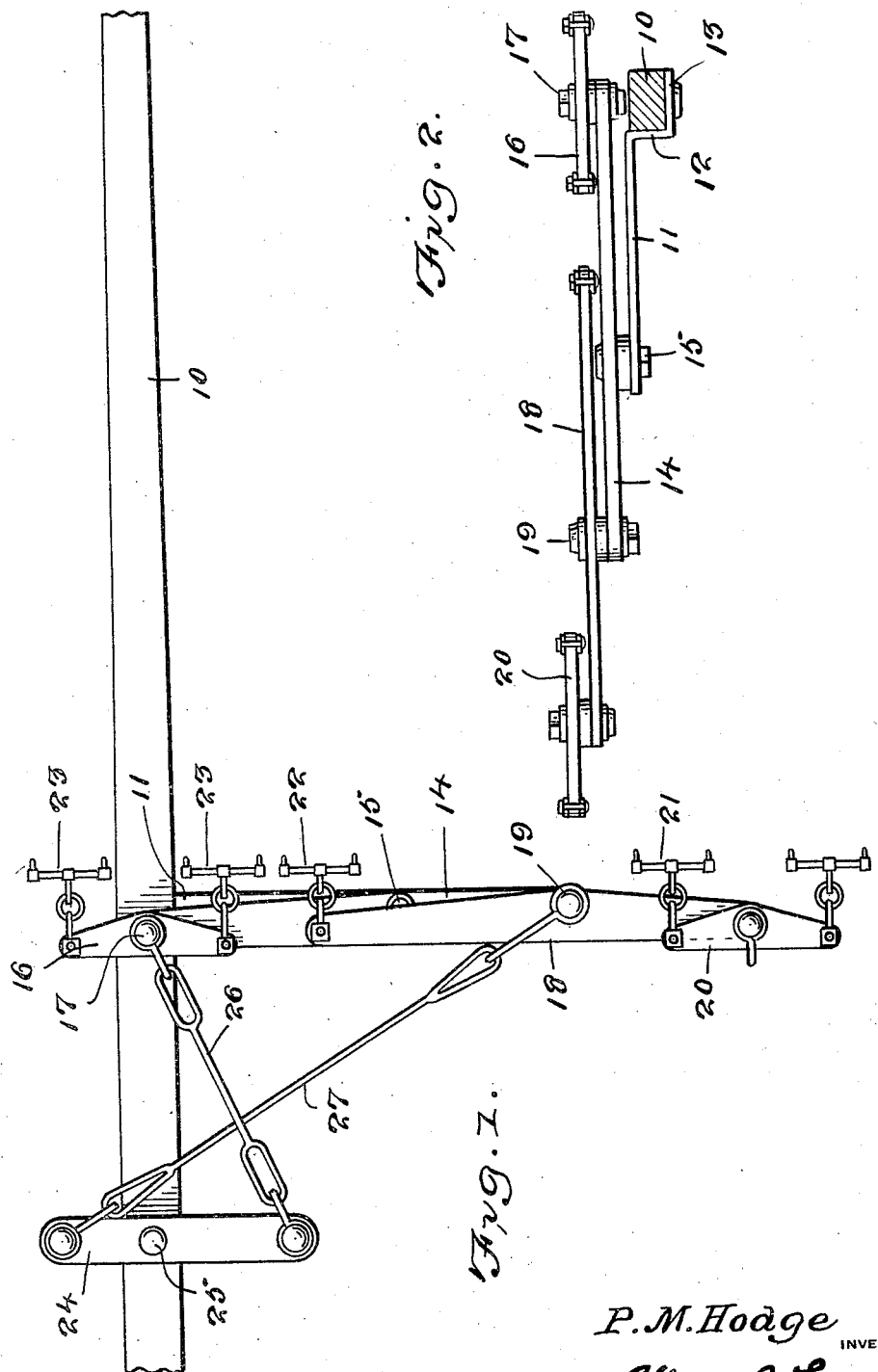
P. M. Hodge
INVENTOR
BY Victor J. Evans
ATTORNEY Patented June 24, 1930

1,766,384

UNITED STATES PATENT OFFICE

PEARLE M. HODGE OF BARNSTON, NEBRASKA

ANIMAL DRAFT EQUALIZER

Application filed March 1, 1929. Serial No. 343,660.

This invention more particularly relates to draft appliances adapted for use upon agricultural implements and the like.

An object of the invention comprises an evener bar having single trees and whiffle trees connected therewith.

Another object of the invention comprehends a supporting bar upon the implement tongue and eccentrically mounting the single and whiffle trees thereon.

An additional object of the invention consists in the provision of an equalizer bar adapted to equalize the draft between the single and whiffle trees.

With the above and other objects in view, the invention further consists in the following novel features and details of construction, to be hereinafter more fully described, illustrated in the accompanying drawing and pointed out in the appended claim.

In the drawing:—

Figure 1 is a top plan view of the invention.

Figure 2 is a front elevation thereof.

Referring to the drawing in detail, wherein like characters of reference denote corresponding parts, the reference character 10 indicates the tongue of wagon or implement, not shown. A supporting bar 11, successively offset, as at 12 and 13, adjacent one end, are adapted to be secured to one side and bottom of the tongue 10, substantially as illustrated in Figure 2 of the drawing. An evener bar 14, pivotally and eccentrically mounted, as indicated at 15, upon the opposite end of the supporting bar 11, is adapted to dispose the longer end thereof toward and above the tongue 10. A whiffle tree 16 is pivotally mounted, as at 17, upon the upper side of the longer end of the evener bar whereas a three horse evener 18 is pivotally mounted, as indicated at 19, upon the shorter end of the evener bar.

An additional whiffle tree 20, of proportions corresponding to that of the whiffle tree 16, is pivotally mounted upon the outermost end of the three horse evener 18 and having single trees 21 upon the ends thereof. A single tree 22 is adapted for connection with the opposite end of the three horse evener 18 whereas single trees 23 are carried upon the ends of the whiffle tree 16.

An equalizer bar 24, eccentrically mounted, as indicated at 25, upon the upper side of the tongue 10 behind the whiffle tree 16, is adapted for connection at its longer end with the pivot connection 17 for the whiffle tree 16 upon the longer end of the evener bar 14 through the instrumentality of a connecting link 26.

A relatively long connecting link 27 is adapted to establish the means of connection between the shorter end of the evener bar and the pivot connection 19 for the three horse evener 18 upon the shorter end of the evener bar 14.

From the foregoing description and accompanying drawing, it is noted that the horses having connection with the single trees 23 and operating from and upon the longer ends of both the evener and equalizer bars will direct the draft upon the three horses having connection with the single trees 21 and 22.

The invention is susceptible of various changes in its form, proportions and minor details of construction, and the right is herein reserved to make such changes as properly fall within the scope of the appended claim.

Having thus described the invention, what is claimed is:—

A draft equalizer comprising a supporting bar having connection at one end and projecting laterally of a vehicle tongue, an evener bar pivotally and eccentrically mounted upon the other end of the supporting bar having its longer end extended above said tongue, a three-horse evener pivotally and eccentrically mounted upon the outermost shorter end of the evener bar having its longer end extended over the aforementioned extremity of the evener bar, whiffle trees carried upon the outermost ends of the evener bar and three-horse evener respectively, single trees for the whiffle trees and longer end of the three-horse evener, and an equalizer bar pivotally and eccentrically mounted upon the tongue behind the evener bar having linkage connections between the long and short ends thereof with the evener bar and three-horse evener respectively.

In testimony whereof I affix my signature.

PEARLE M. HODGE.